March 15, 1932.   R. A. NELSON   1,849,951
DOOR GUARD
Filed Dec. 9, 1929
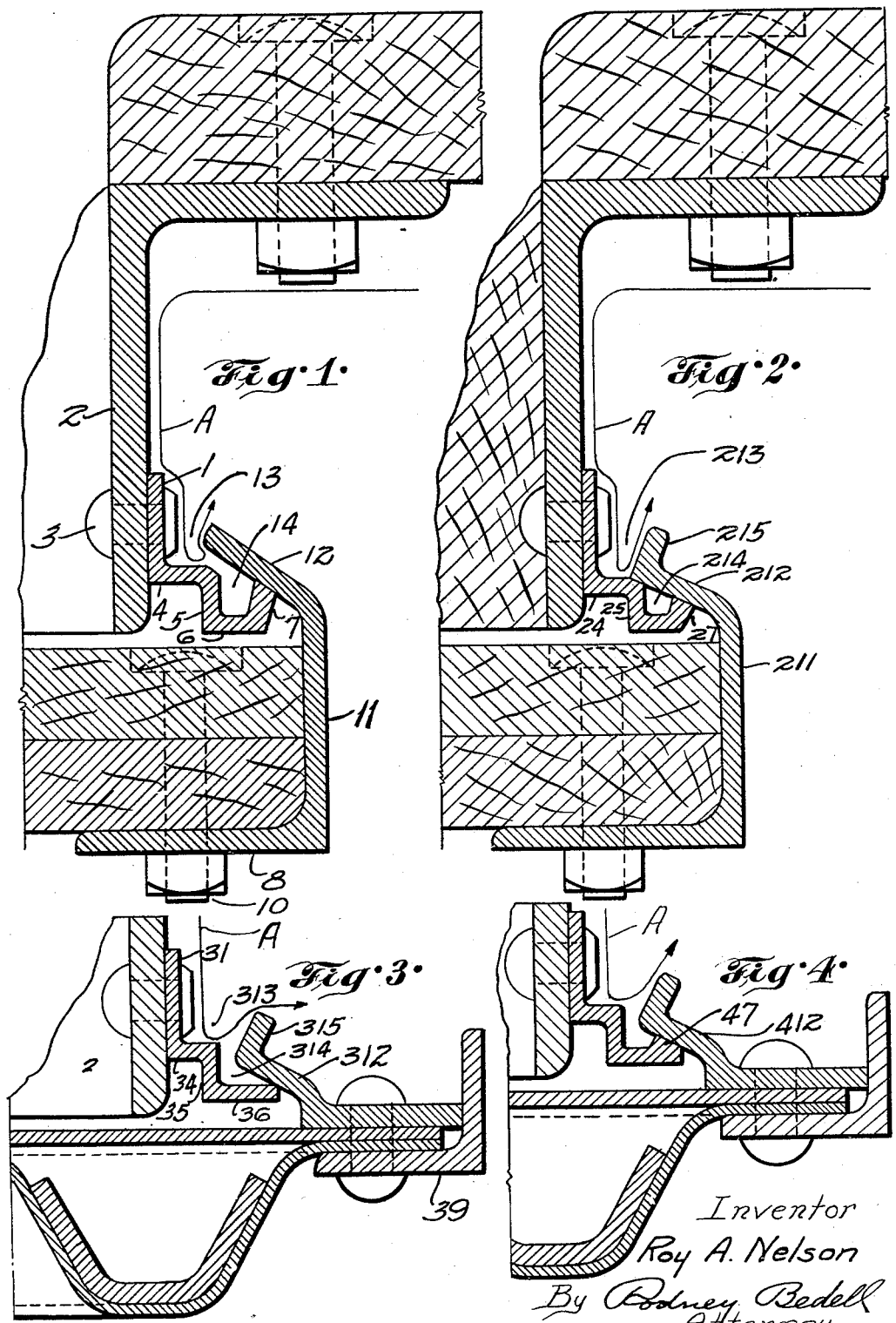
Inventor
Roy A. Nelson
By Rodney Bedell
Attorney Patented Mar. 15, 1932

1,849,951

UNITED STATES PATENT OFFICE

ROY A. NELSON, OF CHICAGO, ILLINOIS, ASSIGNOR TO CHICAGO RAILWAY EQUIPMENT COMPANY, OF CHICAGO, ILLINOIS, A CORPORATION OF ILLINOIS

DOOR GUARD

Application filed December 9, 1929. Serial No. 412,837.

My invention relates to devices used in connection with sliding doors for railway cars and particularly to means for preventing moisture, sparks, cinders and other foreign elements form entering at the rear of the door when the door is closed.

It has been the custom for freight car builders to attach to a door post, adjacent to the rear of a sliding door, a guard strip fashioned to provide a single weather excluding pocket, and to provide the strip with a lip beyond the weather excluding pocket for engagement with a weather bar attached to the rear end of the cooperating door. This construction has the disadvantage that if the engagement of the lip and the weather bar is not tight, the weather excluding pocket remains the only protecting element for the inside of the car and water or other material may escape the influence of the stream of air in the weather excluding pocket and find its way between the door and post to the interior of the car.

One of the objects of my invention is to provide a car door and frame with cooperating elements having a plurality of weather excluding pockets arranged to increase the protection afforded the inside of the car whether or not the interengagement of pocket forming elements is perfect.

Another object of my invention is to provide a car door and frame with cooperating elements having spaced contacts forming a weather excluding pocket between them to further insure the protection of the inside of the car.

In the accompanying drawings which illustrate my invention:

Figure 1 is a horizontal section taken through the rear door post and adjacent portion of the door showing one form of my novel guard strip and weather bar in engaged position.

Figures 2, 3 and 4 are sections corresponding to Figure 1 but illustrating different modifications of my invention.

The attaching base 1 of my guard strip shown in Figure 1 is secured to the metal rear door post 2 by means of securing elements 3. From the outer edge of the attaching base 1, the guard strip projects rearwardly as indicated at 4 and then outwardly as indicated at 5 and then rearwardly again as indicated at 6 to form a W shaped member. An inwardly projecting lip 7 is shown at the rear edge of the W shaped member.

The attaching base 8 of the weather bar is secured to the rear of the door 9 by means of securing elements 10. From the rear edge of the attaching base 8, the weather bar projects inwardly as indicated at 11 and then inwardly and forwardly as indicated at 12. The weather bar and the guard strip engage at the edge of the latter's lip 7 and cooperate to form two open pockets 13 and 14, the guard strip and weather bar approaching each other between these two pockets, but not engaging each other to shut the pockets off from each other.

In the modification illustrated in Figure 2, the lip 27 of the guard strip is shorter than the lip 7 in Figure 1, the portion 212 of the weather bar is shorter than the portion 12 in Figure 1, the weather bar is bent at a sharper angle between portions 211 and 212 than the weather bar in Figure 1 is between portions 11 and 12, and there is a flange 215 at the inner edge of the weather bar in Figure 2 and none at the inner edge of the weather bar in Figure 1. These changes over the construction shown in Figure 1 allow the weather bar and the guard strip in Figure 2 to engage each other at two places, one engagement being at the edge of portion 27 of the guard strip and the middle of portion 212 of the weather bar and the other engagement being at the edge of portion 212 of the weather bar and the meeting of portions 24 and 25 of the guard strip. This dual engagement of the weather bar and the guard strip forms an open pocket 213 facing the elements to be excluded and an inside closed pocket 214. Flange 215, at the inner edge of the weather bar projects inwardly and rearwardly to complete the weather excluding pocket 213.

In Figure 3, the guard strip takes the form of a W shaped member 31, 34, 35, 36 similar to the W shaped portion of the guard strip illustrated in Figure 1. The weather bar is mounted adjacent the post 39 of an all steel door and extends forwardly and inwardly from its mounting as indicated at 312 and engages the rear edge of portion 36 and terminates in an inwardly and rearwardly extending flange 315 which is projected from a line between the meeting of the portions 34 and 35 and the rear edge of the portion 36 of the guard strip. There are two open pockets 313 and 314 in this modification.

In the modification illustrated in Figure 4, the W shaped member has an outwardly and rearwardly sloping lip 47 upon which the portion 412 of the weather bar rests.

The outer pocket in each of the modifications has a substantial opening at one side and tends to create an eddy current of air, as indicated by the lines A, serving to whirl out the greater proportion of the wind, water, sparks, cinders or other damaging elements that otherwise tend to enter the car behind the rear edge of the door. The inner pocket is substantially closed and forms an additional trap for material which escapes from the air current A and tends to prevent leakage through any crevices which may exist because of lack of contact of the guard strip and weather bar throughout their length.

In each form of my invention the inner edge of the door member cooperates with the guard strip on the post member to form the eddy pocket making possible the use of a rolled member on the post without any further bending being required to form a re-entrant angle.

The forms illustrated in Figures 1 and 2 may be adapted to steel cars and those illustrated in Figures 3 and 4 may be adapted to wooden cars and various other modifications in the details of my invention may be made without departing from the spirit of my invention and I contemplate the exclusive use of all such modifications as come within the scope of my claims.

I claim:

1. A guard strip for a car door comprising a substantially W like member including an attaching base and portions projecting rearwardly and outwardly therefrom, each indentation of said member forming at least a part of each of a series of successive weather excluding pockets.

2. A guard strip for a car door post comprising a substantially W shaped member including an attaching base and portions projecting rearwardly and outwardly therefrom, each indentation of said member forming a part of each of a series of sucessive weather excluding pockets, and including another portion projecting inwardly from the rear edge of said W shaped member to engage a cooperating door element and hold the same spaced from the intermediate part of said member.

3. In combination, a car door post and a door, said post having mounted thereon a guard strip comprising a substantially W shaped member including an attaching base and elements projecting rearwardly and outwardly therefrom, and said door being provided with a weather bar having a forwardly and inwardly presented element adapted to at least partially cover one indentation of said guard strip and to form an open eddy pocket with the other indentation of said guard strip.

4. In combination, a door post and a sliding door, said post having mounted thereon a guard strip comprising a substantially W shaped member including an attaching base and elements projecting rearwardly and outwardly therefrom, a lip projecting inwardly from the rear edge of said W shaped member, said door being provided with a weather bar, a flange projecting inwardly and rearwardly therefrom, said weather bar being adapted to engage said lip and also to engage the middle projection of said W member to form a substantially closed pocket with one indentation of said W member and said lip, and said flange cooperating with the other indentation of said W member to form an eddy pocket adjacent to said closed pocket.

5. In combination, a door post and a sliding door, a guard strip on said post and a weather bar on said door, said guard strip including in an integral structure an attaching base, a rearwardly directed jutting portion and an intermediate salient portion, and said weather bar being adapted to engage said jutting portion and overlap said salient portion to form a plurality of weather excluding pockets when said door is in a closed position.

6. A weather excluding device for a car door and a door post comprising a post strip including an attaching base, a rearwardly directed abutting portion, and an intermediate salient portion, and also comprising a door bar adapted to simultaneously engage said abutting portion and said salient portion and to project beyond the latter to form a closed weather excluding pocket and an open eddy pocket in front thereof, said salient portion forming a baffle plate to deflect deleterious matter from the pocket structure.

In testimony whereof I hereunto affix my signature this 25th day of November, 1929.

ROY A. NELSON.